April 1, 1924.
L. B. WELCH
1,489,184
GASKET AND METHOD OF MAKING THE SAME
Filed Nov. 25, 1919      2 Sheets-Sheet 1
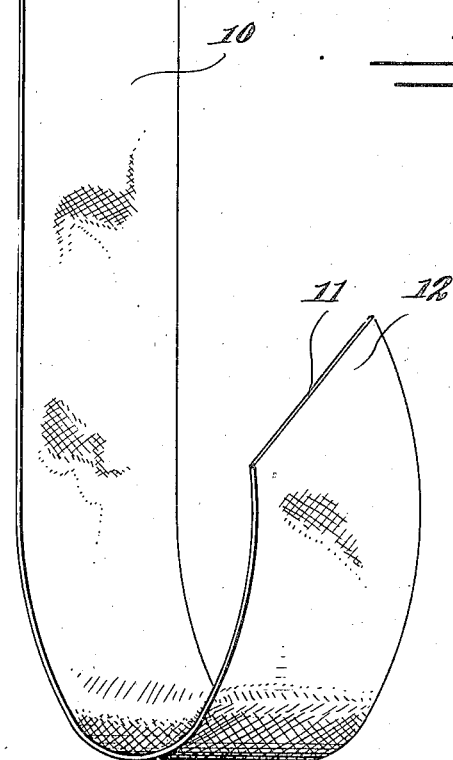
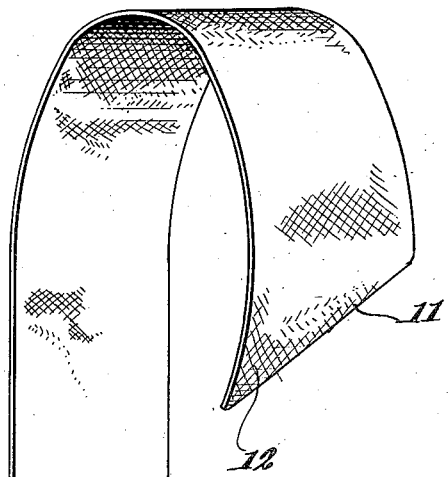
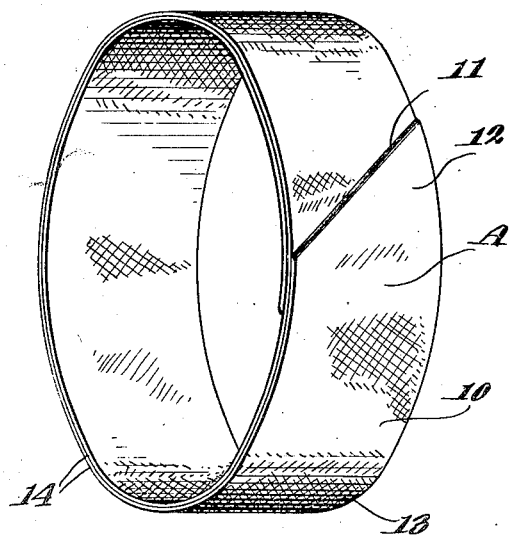
Lawrence B. Welch
Inventor

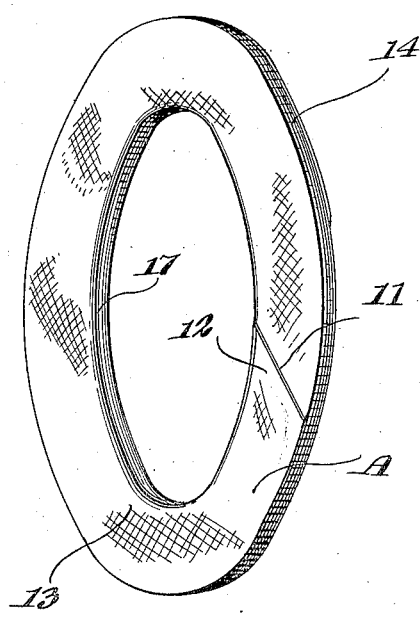
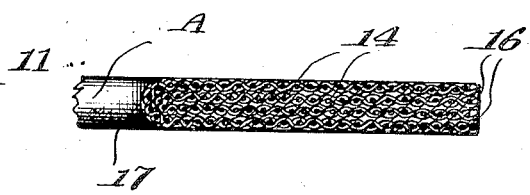
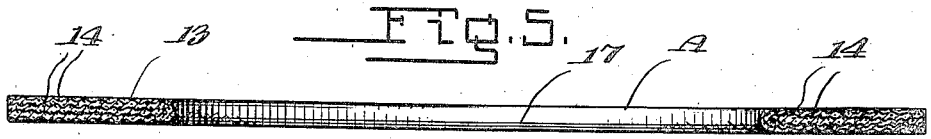

Patented Apr. 1, 1924.

1,489,184

UNITED STATES PATENT OFFICE.

LAWRENCE B. WELCH, OF REYNOLDSVILLE, PENNSYLVANIA, ASSIGNOR, BY MESNE ASSIGNMENTS, TO ALVIN LEWIS, OF NEW YORK, N. Y.

GASKET AND METHOD OF MAKING THE SAME.

Application filed November 25, 1919. Serial No. 340,507.

*To all whom it may concern:*

Be it known that I, LAWRENCE B. WELCH, a citizen of the United States, residing at Reynoldsville, in the county of Jefferson and State of Pennsylvania, have invented certain new and useful Improvements in Gaskets and Methods of Making the Same, of which the following is a specification.

This invention relates to gaskets, and the primary object of the invention is the provision of an improved gasket which will be simple and easy to manufacture and in which all waste of material is avoided.

Another object of the invention is to provide an improved gasket constructed from a single strip of material so formed as to provide a flat annular body which will be uniform in contour, and including a plurality of superposed plies, the inner wall of the body presenting an unbroken rounded surface, so that wear of the same will be reduced to a minimum.

A further object of the invention is to provide an improved method for forming a gasket or other flat annular body from a length of material, which will eliminate the necessity of providing expensive machinery and entirely obviate the employance of die cutters, or the like.

Other objects of the invention will appear in the following detailed description, taken in connection with the accompanying drawings, forming a part of this specification, and in which drawings:

Figure 1 is a detail perspective view of a strip of material, from which the gasket is to be formed.

Figure 2 is a perspective view showing the gasket in its partly finished form.

Figure 3 is a perspective view of the partly finished gasket showing a step in its construction after the strip has been formed as illustrated in Figure 2.

Figure 4 is a detail perspective view of the finished gasket.

Figure 5 is a diametric section taken through the same, and

Figure 6 is an enlarged detail transverse section through the improved gasket.

Referring to the drawings in detail, wherein similar reference characters indicate corresponding parts throughout the several views, the letter A indicates the improved gasket which is preferably formed of a single strip of asbestos or the like 10 cut to the desired width. The strip 10 has its terminals cut on the bias as at 11, so as to form relatively narrow pointed ends 12. As clearly shown in Figure 2 of the drawings, the strip is coiled in any suitable or preferred manner to provide an annular body 13 having a plurality of plies 14. The strip 10 of course can be made of any desired length so as to provide any number of plies as may be desired. Instead of providing a strip, a sleeve or cylinder of the desired material may be provided and then cut into the desired width to form the annular bodies. In forming the annular body 13 the strip can be wound around a cylindrical form having the desired diameter to provide the desired sized gasket. The pointed terminals 12 of the strip 10 are preferably overlapped, when the strip 10 is coiled to provide the annular body 13, as clearly shown in Figure 2 of the drawings. If so desired pressure may be applied to the body 13, so as to make the plies 14 adhere together, or suitable flexible cement may be used.

After the annular body 13 is formed, the same is doubled on a central circumferential line 15 in any preferred manner to form the overlapping flanges 16. The gasket automatically shapes itself when the edges are bent outward and the center is pushed inwardly. The flanges 16 are then pressed together by a suitable means, and owing to the nature of the material used, the same will adhere to each other. If necessary a suitable cement may also be used.

While I have specified asbestos, it is to be understood that any other suitable material may be used when desired or found necessary.

From the foregoing description it can be seen that an improved gasket is provided of exceptionally simple and durable character which is simple and easy to manufacture and entirely obviates the necessity of the employance of die cutters or other expensive and intricate machinery.

By doubling the body on itself, an inner smooth unbroken rounded edge 17 is provided, which prevents undue wear on the gasket.

Changes in details may be made without departing from the spirit or scope of my invention; but,

I claim:

1. A packing gasket comprising an annular body including an outer section having upper and lower ply sections, and an inner two ply section arranged intermediate the wear faces of the outer section, the ply sections of the outer section and the plies of the inner section being respectively integrally connected together at the inner margin of the gasket.

2. That method of forming a gasket from a flat strip consisting of cutting the ends of a strip on the bias, and coiling the strip with the cut terminals in overlapping relation, and doubling and compressing the coiled strip together.

3. That method of constructing a gasket, which consists in spirally winding a length of gasket material of uniform width from end to end into a plurality of overlapping annular convolutions so that the side marginal edges of said convolutions are flush with each other, and doubling the annular convolutions upon a central circumferential line to provide a gasket in which the marginal edges of the convolutions are flush and form the outer circumference thereof.

4. As a new article of manufacture, a packing gasket including a single length of material coiled upon itself to provide a plurality of convolutions, the coils being doubled back along a central circumferential line to present a flat structure having a plurality of nested layers of U-shape in cross section.

LAWRENCE B. WELCH.